(12) United States Patent
Xin

(10) Patent No.: US 10,460,013 B2
(45) Date of Patent: *Oct. 29, 2019

(54) USING SERVER SIDE FONT PREPARATION TO ACHIEVE WYSIWYG AND CROSS PLATFORM FIDELITY ON WEB BASED WORD PROCESSOR

(71) Applicant: EMC Corporation, Hopkinton, MA (US)

(72) Inventor: Wang Xin, Mountain House, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,474

(22) Filed: Jun. 7, 2018

(65) Prior Publication Data

US 2018/0349331 A1 Dec. 6, 2018

Related U.S. Application Data

(63) Continuation of application No. 14/256,101, filed on Apr. 18, 2014, now Pat. No. 10,055,386.

(51) Int. Cl.
*G06F 17/00* (2019.01)
*G06F 17/21* (2006.01)
*G06F 16/9038* (2019.01)
*G06F 17/22* (2006.01)

(52) U.S. Cl.
CPC ........ *G06F 17/214* (2013.01); *G06F 16/9038* (2019.01); *G06F 17/2247* (2013.01)

(58) Field of Classification Search
CPC ................................. G06F 17/00; G06F 17/21

USPC .................................. 715/234, 256, 251, 269
See application file for complete search history.

(56) References Cited

U.S. PATENT DOCUMENTS

| | | | |
|---|---|---|---|
| 6,323,864 B1 | 11/2001 | Kaul | |
| 7,492,366 B2 * | 2/2009 | Burago | G06F 17/215 345/467 |
| 7,783,969 B1 * | 8/2010 | Menninga | G06F 17/211 715/243 |
| 7,999,950 B1 * | 8/2011 | Cohen | G06F 3/1208 358/1.11 |
| 10,019,415 B1 * | 7/2018 | Wombell | G11B 27/034 |
| 10,055,386 B2 * | 8/2018 | Xin | G06F 17/214 |
| 10,068,613 B2 * | 9/2018 | Wharton | G11B 27/034 |

(Continued)

*Primary Examiner* — Stephen S Hong
*Assistant Examiner* — Matthew J Ludwig
(74) *Attorney, Agent, or Firm* — Van Pelt, Yi & James LLP

(57) ABSTRACT

A system and method is illustrated for platform-independent rendering of a document in a web browser supporting a two-dimensional (2D) canvas. The system and method includes obtaining the document, wherein the document includes text characters, text elements, and associated style information including at least one font, determining that font metrics do not exist, and obtaining the font metrics for the at least one font, using the font metrics and the text elements to determine how the document is divided into page criteria, determining a font file does not exist, and obtaining the font file for the at least one font, and rendering the document by drawing glyphs associated with the text characters in the 2D canvas, using the font file and the page criteria, so that the at least one font and the page criteria are platform-independent.

20 Claims, 11 Drawing Sheets

(56) References Cited

U.S. PATENT DOCUMENTS

| | | |
|---|---|---|
| 2002/0184270 A1 * | 12/2002 | Gimson ............ G06F 17/30905 715/269 |
| 2010/0218086 A1 | 8/2010 | Howell |
| 2011/0090230 A1 | 4/2011 | Bacus |
| 2011/0093565 A1 | 4/2011 | Bacus |
| 2011/0115797 A1 | 5/2011 | Kaplan |
| 2011/0119573 A1 | 5/2011 | Rudolph |
| 2011/0258535 A1 | 10/2011 | Adler, III |
| 2012/0079374 A1 | 3/2012 | Gaddis |
| 2015/0234793 A1 | 8/2015 | Patel |

* cited by examiner

FIG. 2B

Lorem ipsum dolor sit amet, consectetur adipiscing elit. Aliquam porta felis sapien. Nam at tortor non dui pellentesque iaculis. Aenean scelerisque diam id ante euismod blandit. Vestibulum ante ipsum primis in faucibus orci luctus et ultrices posuere cubilia Curae; Ut ac velit vel augue fermentum congue eu nec orci. Nullam at nunc neque. Etiam consectetur consequat mollis. Nulla facilisi. In dignissim, felis a pellentesque pretium, leo nunc pharetra diam, sit amet commodo augue tortor sed ipsum. Etiam et nunc eget justo tincidunt imperdiet. Praesent dictum velit lacus, ut venenatis neque. Cras eu nulla sapien, pharetra eleifend urna. Nam vitae lorem nec sem hendrerit tristique sit amet gravida ante. Aliquam rutrum commodo sem vitae sodales. Phasellus quam purus, consectetur eget cursus ut, mattis vitae libero. Curabitur id iaculis quam.

Vivamus ipsum elit, dignissim eget interdum et, ultrices ac velit. Pellentesque mollis lectus tempus urna commodo lobortis. Nullam tincidunt, risus imperdiet bibendum pharetra, turpis augue bibendum ligula, et hendrerit purus erat mollis erat. Duis ullamcorper pulvinar aliquam. Aenean aliquam rhoncus egestas. Ut in venenatis lectus. Maecenas tortor elit, feugiat quis fringilla et, malesuada molestie metus. Etiam egestas nibh ac neque mattis non sodales diam rhoncus. Aliquam volutpat consequat molestie. Mauris elit ligula, rhoncus ut vehicula vitae, feugiat vel metus. Aliquam ac tellus a risus ultrices iaculis at ut nisi. Maecenas ac gravida libero. Ut eleifend sodales urna, quis rhoncus metus vulputate at. Duis rhoncus, enim eget dapibus bibendum, nibh quam pharetra tellus, sit amet sagittis ipsum felis id mauris.

Pellentesque facilisis fermentum lorem in accumsan. Phasellus viverra aliquet augue eu volutpat. Praesent dictum, nunc euismod sollicitudin eleifend, lorem mauris scelerisque lectus, sed ultrices nibh dolor consequat erat. Integer pretium, erat vitae volutpat semper, ante urna sollicitudin enim, nec tincidunt odio neque vitae lacus. Mauris in purus neque, in consectetur ante. Morbi lobortis justo eget velit sollicitudin nec cursus augue eleifend. Cras auctor sagittis pretium. Suspendisse tincidunt, dolor a dapibus feugiat, lorem magna consectetur diam, eu

FIG. 2D

USING SERVER SIDE FONT PREPARATION TO ACHIEVE WYSIWYG AND CROSS PLATFORM FIDELITY ON WEB BASED WORD PROCESSOR

CROSS REFERENCE TO OTHER APPLICATIONS

This application is a continuation of co-pending U.S. patent application Ser. No. 14/256,101 entitled USING SERVER SIDE FONT PREPARATION TO ACHIEVE WYSIWYG AND CROSS PLATFORM FIDELITY ON WEB BASED WORD PROCESSOR filed Apr. 18, 2014 which is incorporated herein by reference for all purposes.

FIELD

The present system and method relates generally to browser-based word processor, and more specifically to conveying consistent layouts of electronic documents in different browsers.

BACKGROUND

Cloud computing involves executing applications via a web browser or web app, and obtaining information for the applications from a remote server system or service. Cloud computing provides advantages over traditional desktop software, such as the ability to access documents from various different computers and locations. Office productivity application is one type of application currently being delivered by the cloud. For example, users may use their web browsers to edit word processing documents that are stored on a remote system even without desktop productivity software installed on a local computing device.

Web browsers do, however, place a number of limits on programs that run on them. Web browsers may run on different computing devices with different operating systems. Each operating system may have different algorithm to render fonts. For example, WINDOWS® (a registered trademark of the Microsoft Corporation of Redmond, Wash.) operating system renders text sharply, but MAC® (a registered trademark of the Apple Inc. of Cupertino, Calif.) operating system gives preference to precision. Thus, the same body of text may be rendered differently on different computing devices running different operating systems. When a web browser relies on the underlying operating system font rendering algorithm for text display, the rendered text may be displayed differently on different platforms. As a result, WYSIWYG experience may be a goal difficult to achieve when editing documents using a web based word processor.

BRIEF DESCRIPTION OF THE DRAWINGS

Some embodiments of the system and method are described, by way of example, with respect to the following figures:

FIG. 2B is a diagram of an example GUI illustrating a WYSIWYG view of FIG. 2A document in a web browser on a desktop computing device running Windows® Operating System (OS).

FIG. 2D is a diagram of an example GUI illustrating a WYSIWYG view of FIG. 2A document in a web browser on a mobile computing device.

DETAILED DESCRIPTION

Figure 1:
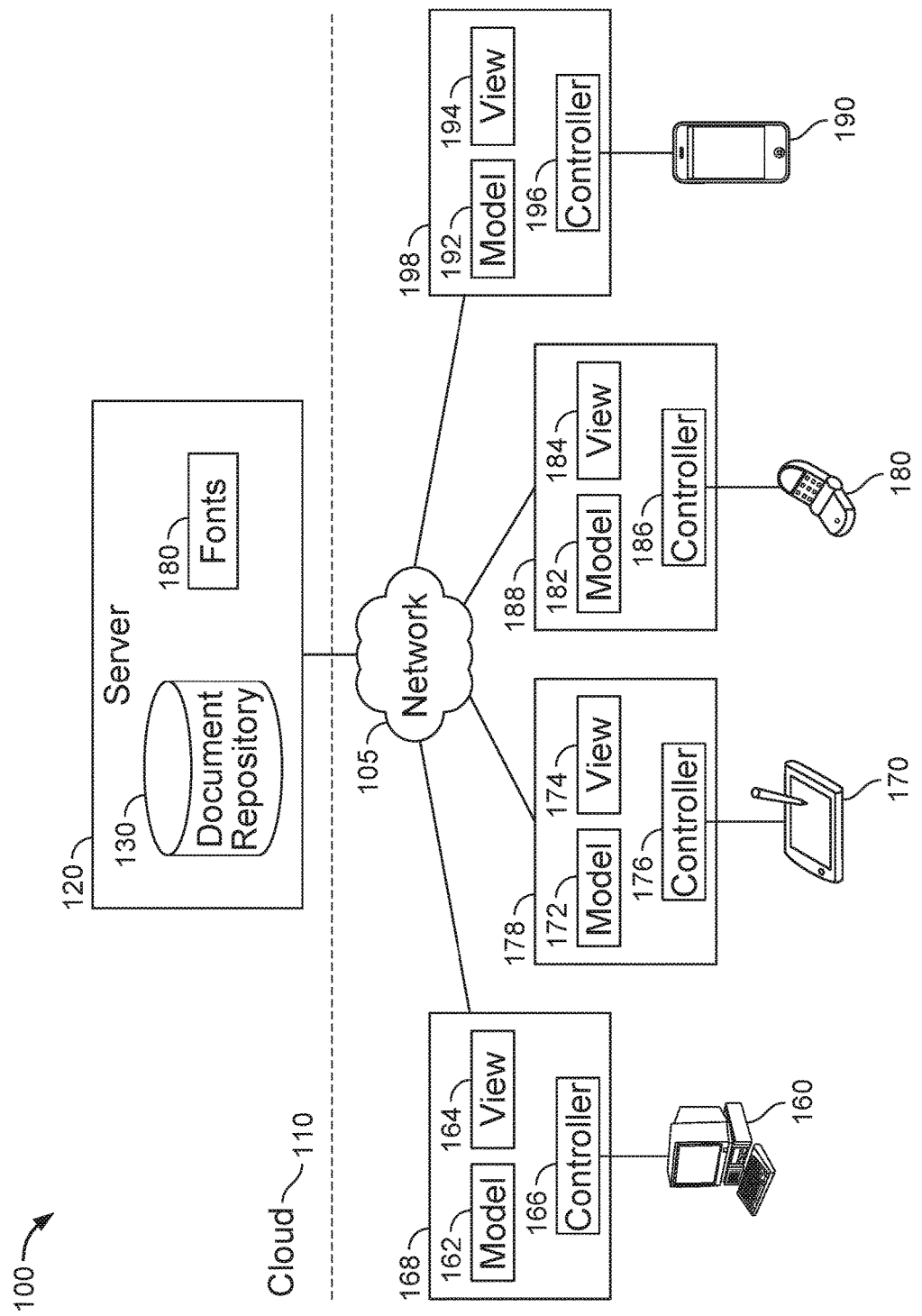
FIG. 1 is a diagram of an example system illustrating using server side font preparation to achieve "What You See Is What You Get" (WYSIWYG) and cross platform fidelity.

A detailed description of one or more example embodiments of a system and method is provided below along with accompanying figures. While this system and method is described in conjunction with such embodiment(s), it should be understood that the system and method is not limited to any one embodiment. On the contrary, the scope of the system and method is limited only by the claims and the system and method encompasses numerous alternatives, modifications, and equivalents. For the purpose of example, numerous specific details are set forth in the following description in order to provide a thorough understanding of the present system and method. These details are provided for the purpose of example, and the system and method may be practiced according to the claims without some or all of these specific details. For the purpose of clarity, technical material that is known in the technical fields related to the system and method has not been described in detail so that the present system and method is not unnecessarily obscured.

It should be appreciated that the present system and method may be implemented in numerous ways, including as a process, an apparatus, a device, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the system and method. Applications may also be downloaded, in whole or in part, through the use of a software development kit or toolkit that enables the creation and implementation of the present system and method. In this specification, these implementations, or any other form that the system and method may take, may be referred to as techniques. In general, the order of the steps of disclosed processes may be altered within the scope of the system and method.

Techniques are described herein for rendering text in web based word processing application with consistent layout cross platforms and devices. Web based word processing application can be provided to a user through a browser, so that the user can receive the benefits of cloud computing with the power and flexibility of traditional desktop applications, such as "What You See Is What You Get" (WYSIWYG) presentation of document, among other features. Providing WYSIWYG is important for document authors and users to predict the layout of text in browsers on different platforms and devices.

Text in web pages typically is rendered by a browser in a particular font using browser executable instructions. The information needed to render web page text in a particular font may be locally available to the browser or obtained by the browser from a remote resource. For example, the text render in some browsers use fonts information included in the operating system on which the browser executes. Using this approach, text may be rendered differently in different operating systems, since different operating system may have different algorithm to render font. For example, line break and/or page break positions may be different on different computing devices running different operating systems. This may pose a significant challenge to providing WYSIWYG presentation of document in web based word processing application.

In some example embodiments, in order to provide WYSIWYG, instructions may be given in a web page for the browser to retrieve from a server the text rendering information. The instructions may include a Uniform Resource Locator (URL) at which the browser may download a font file from a remote server. The font file may include font rendering information for rendering all characters in a character set in a particular font. In other words, a font file for a particular font typically defines all characters in a character set in the particular font. The font file may include instructions for building outlines from scalable lines and curves, which are filled to create the solid shapes of glyphs. In addition to the information obtained from the font file, the text rendering information may include the character positions for rendering. The calculation of the character positions may be based on the font files stored on the server. Using server side font preparation, the layout of a document, including character, line break, and page break positions, is consistent cross platforms and devices. With consistent layout and font rendering information, embodiments of the system and method described herein may provide WYSIWYG and cross platform fidelity in web based word processing.

In some example embodiments, the web based word processing application may be executed by a web browser using a model-view-controller framework. In general, the model-view-controller implementation provides for the download of a model from a server to a client. The model may then be rendered to form a view that may be managed by the web browser on the client. The controller may intercept actions, such as clicks on icons and keystrokes on a keyboard, and may cause such actions to be implemented. The model-view-controller implementation according to an example embodiment provides a web based word processing application that runs in a web browser. The application may use programming code, such as HTML and JavaScript code, to download a document model from a server that hosts the online word processing functionality. The application may create a user interface within the browser, and may place an editing surface on the display of the browser where the body of the document is to be displayed. The application may further calculate for character positions for rendering. After the calculation, the document may be displayed in the browser by rendering according to the calculation result in the view using a native rendering engine.

According to an example embodiment, the rendering may be performed by drawing characters at the calculated locations. The drawing information for a character may be based on a description of one or more glyphs representing the character. To ensure WYSIWYG and cross platform fidelity, the description of the one or more glyphs is obtained from a font file stored on a server. The font drawing information for the one of more glyphs may then be rendered on a browser drawing surface. An HTML5 canvas element is one example of a browser drawing surface for rendering the one or more glyphs of a character in a particular font. The HTML5 canvas is supported by popular browsers, such as INTERNET EXPLORER® 9 (a registered trademark of the Microsoft Corporation of Redmond, Wash.), FIREFOX® (a registered trademark of the Mozilla Corporation of Mountain View, Calif.), CHROME™ (a trademark of the Google Inc. of Mountain View, Calif.), SAFARI™ (a trademark of the Apple Inc. of Cupertino, Calif.), and OPERA™ (a trademark of the Opera Software of San Diego, Calif.), among others. It should be understood that other browser supported drawing surface may be used in place of HTML5 canvas, and embodiments are not limited to only browsers that support the HTML5 canvas or its successive implementations.

A font, as used herein, represents an organized collection of glyphs that share a common "look and feel" such that, when a string of characters is rendered together, the result conveys a particular artistic style and provides consistent inter-character alignment and spacing. A glyph, as used herein, is a unit of rendered content in a font. Typically, but not always, there is a one-to-one correspondence between characters to be rendered and the corresponding glyphs. For example, a letter and an associated diacritical mark, such as é, may be comprised of separate glyphs. Typically, a glyph is defined by one or more shapes, such as a path representing the geometry of the outline of a two-dimensional object.

FIG. 1 is an example system 100, in which a web based word processing environment using server side font preparation to achieve WYSIWYG and cross platform fidelity may be implemented. The system 100 may include at least one server 120 in a cloud environment 110. Through server 120, the cloud 110 may provide web based word processing services to browser applications 168, 178, 188, and 198 running on computing devices 160, 170, 180, and 190. Each of the applications may be executed by a web browser and may include model, view, and controller components. The applications 168, 178, 188, and 198 may be configured to execute computer code (e.g., HTML, JavaScript, and other code running in a web browser) to display a word processing User Interface (UI) for performing web based word processing.

The server 120 may include a document repository 140 and a fonts system 180. Documents edited using the web based word processing application may be stored in the document repository 140. Though FIG. 1 shown the document repository 130 as residing on the server 120, the document repository may reside inside or outside the server 120, or may be distributed among multiple servers within the cloud 110. Documents stored in the document repository 130 may be stored using a markup language such as eXtensible Markup Language (XML). And information associated with the documents stored in the document repository 130 may include document text and document formatting information, among others. In some example embodiments, the document formatting information may include elements of documents, such as paragraphs, spans, characters, styles, etc.

The documents stored in the document repository 140 may be accessed by users using computing devices, such as a desktop computing device 160, a tablet computing device 170, a mobile computing device 180, or a smart phone 190. The users may bring up the web based word processing application on browsers running on the computing devices 160, 170, 180, and 190. The devices 160, 170, 180, and 190 may be communicatively coupled to the server 120 in a variety of configures or topologies as are known in the art. For example, the desktop computing device 160 is communicatively coupled via a network 105 to the server 120. In addition to the desktop computing device 160, the tablet computing device 170, the mobile computing device 180, and/or the smart phone 190, may be communicatively coupled to the server 120 via the network 105. Various operating systems may run on the computing devices 160, 170, 180, and 190 for accessing the web based word processing application. Suitable operating systems may include WINDOWS®, MAC® OS, ANDROID™ (a trademark of the Google Inc. of Mountain View, Calif.), and LINUX™ (a trademark of Linus Torvalds), among others.

Browser applications 168, 178, 188, and 198 providing web based word processing may include models 162, 172, 182, and 192, views 164, 174, 184, and 194, and controllers 166, 176, 186, and 196. The models 162, 172, 182, and 192 may have representations of the document retrieved from the document repository 130, modules to calculate layout of the document, and instructions for the document rendering. The views 164, 174, 184, and 194 may provide visual representations according to output the models 162, 172, 182, and 192. The visual representations may combine the substance of a document with formatting and layout information. Example visual representations are shown in FIGS. 2A-2D. In addition to the rendering, the views 164, 174, 184, and 194 may be used for presenting visual information that is associated with the web based work processing, such as user controls for the application and other word processing data.

The controllers 166, 176, 186, and 196 may be modules to respond to changes in the models 162, 172, 182, and 192 or the views 164, 174, 184, and 194, and may update the models 162, 172, 182, and 192 and the views 164, 174, 184, and 194. For example, listening for user interaction (i.e., user selects a different font) with the presentation of the views 164, 174, 184, and 194, the controllers 166, 176, 186, and 196 may modify the views 164, 174, 184, and 194 by obtaining document data from the server 120 and instruct the views 164, 174, 184, and 194 to render the data. The controllers 166, 176, 186, and 196 may also accept UI event from the views 164, 174, 184, and 194. Based on the UI event (e.g. key pressed), the controller 166, 176, 186, and 196 may update the models 162, 172, 182, and 192. An example model-view-controller implementation is shown with additional details in FIG. 3.

In order to achieve WYSIWYG and cross platform fidelity, in some example embodiments, the models 162, 172, 182, and 192 obtain font information from the fonts system 180 on the server 120. Based on the server fonts system 180, the models 162, 172, 182, and 192 may calculate the location of text in documents and generate platform and device independent layouts. The platform and device independent layouts may include positions of characters. The layout calculation may also include measurements in the context of a canvas, so that line breaks and page breaks positions are calculated independent of platforms and/or devices. The web based word processing applications 168, 178, 188, and 198 may then display the document, along with controls (e.g., buttons and pull-down menus) around the document so that the user may conveniently edit and otherwise interact with the document. FIGS. 2A-2D illustrate a document displayed on various platforms and devices with consistent layout.

Figure 2A:
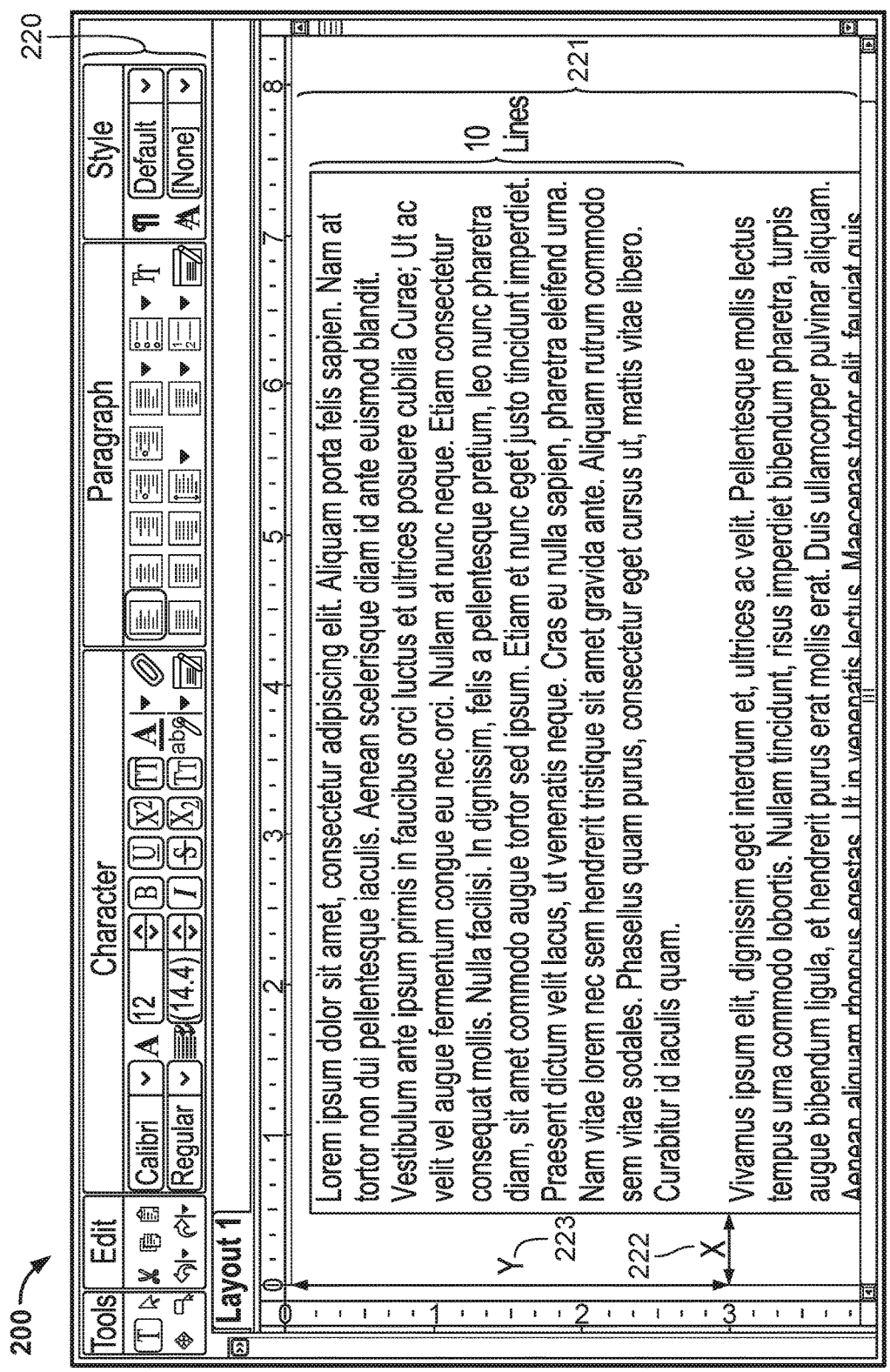
FIG. 2A is a diagram of an example Graphical User Interface (GUI) illustrating word processing of a document in a web based word processor on a tablet computing device.

FIG. 2A is a diagram of an example Graphical User Interface (GUI) 200 illustrating word processing of a document in a web based word processor 210 on a computing device. The web based word processor 210 may be displayed in a web browser. Though not shown in FIG. 2A, the web browser may include toolbars, which may display browser buttons and a browser address bar in a typical format. Below the toolbars may be a variety of controls 220 that may be provided as part of the word processing application loaded on the browser GUI 200. The controls 220 may take a variety of forms and may be laid out in a variety of ways, though a simplified representation is shown here for clarity. The controls 220 may include pull down and pop-up menus in a form with which the user may interact. The controls 220 may also include selectable controls, in the form of icon buttons that a user may click with a mouse or other pointer to perform familiar operations, such as changing the format and layout of a document, or selecting text within a document.

Below the controls 220, an example wire frame 221 displays text rendering of a document according to the method described herein, whereby the layout of the document is WYSIWYG and consistent cross platforms and devices. A user may interact with the controls 220 and make changes, such as changing text font. Such changes may be captured by a controller and update a model accordingly. For example, a selection from the font drop down menu in the controls area 220 is captured by the controller 176 running on the tablet computing device 170. By selecting a different font, the user may indicate a change such as changing a font of selected text block to bold, and the like. Upon detecting the change, the controller 176 may modify the model 172 to include the formatting change. The formatting change may then be sent to the view 174 to render a display of the newly formatted text in the wire frame 221.

The document displayed in the wire frame 221 may be retrieved from the document repository 130 as shown in FIG. 1. Documents stored in the document repository 130 may be stored using a markup language such as XML. And information stored in the document repository 130 may include document text and document formatting information, among others. The document formatting information may include elements of the document, such as paragraphs, spans, characters, styles, etc. The element description provided herein is by way of example. Other groupings or other divisions of a document may be made as necessary or in accordance with design preferences. In FIG. 2A, the wire frame 221 displays a portion of a document for editing in the web based word processing application. A portion of the XML, retrieved from the document repository 130 including elements for the first paragraph of the document and the style is shown below.

```
<style name="Default" nextStyle="Default" baseStyle="None">
<attributes>
    <fontFamily>Calibri</fontFamily>
    <fontSize>12.0</fontSize>
    <fontStyle>Regular</fontStyle>
    <spaceAfter>6.0</spaceAfter>
    <spaceBefore>6.0</spaceBefore>
</attributes>
</style>
<para style="Default">
<span style="None">
<text>Lorem ipsum dolor sit amet, consectetur adipiscing elit. Aliquam porta felis
sapien. Nam at tortor non dui pellentesque iaculis. Aenean scelerisque diam id
ante euismod blandit. Vestibulum ante ipsum primis in faucibus orci luctus et
ultrices posuere cubilia Curae; Ut ac velit vel augue fermentum congue eu nec
orci. Nullam at nunc neque. Etiam consectetur consequat mollis. Nulla facilisi. In
dignissim, felis a pellentesque pretium, leo nunc pharetra diam, sit amet commodo
augue tortor sed ipsum. Etiam et nunc eget justo tincidunt imperdiet. Praesent
dictum velit lacus, ut venenatis neque. Cras eu nulla sapien, pharetra eleifend
urna. Nam vitae lorem nec sem hendrerit tristique sit amet gravida ante. Aliquam
rutrum commodo sem vitae sodales. Phasellus quam purus, consectetur eget
cursus ut, mattis vitae libero. Curabitur id iaculis quam.</text>
</span>
</para>
```

As shown above, XML, tags may be used to group text elements in the document. A document may include at least one paragraph element. Each paragraph element may include at least one span element. A span element may include a segment of text characters that has the same attributes and style. In the example above, the first paragraph illustrated in FIG. 2A has one style, namely the Default style. The Default style is described as font Regular Calibri size 12.0 in the style. And within the paragraph, there is one span element to group the text characters that have the same style, namely the Default style.

When using the web based word processing application on different platforms and devices, the above XML may be retrieved from the document repository 130 and stored in a document model. Elements within the XML may be parsed. According to the style for each span, the corresponding font information may be retrieved from the fonts system 180. And based on the font information, character positions for rendering may be calculated. During the calculation, elements such as pages, lines, and segments of text with the same style in a line may be grouped together. The result may be stored using a markup language such as XML. Once character positions are calculated, the document may be rendered using the platform and device independent layout.

For example, in the wire frame 221, the last line of the first paragraph starts at position (X, Y). The calculation of the position (X, Y) may start with parsing the XML of the document model shown above. Upon extracting the first paragraph element, the style for the paragraph may be examined. Further, span elements within the paragraph element may be examined. After determining the span element uses the default style, font information associated with the default font Regular Calibri size 12 may be located using the font information obtained from the server. Based on the server font information, including width and height of each character, character positions for the paragraph may be calculated.

In some embodiments, segments of text with the same rendering parameters of Regular Calibri size 12 may be grouped together to generate text run elements. Each text run element may have parameters to specify the starting position for rendering. Text runs within each line may be grouped together to generate text line elements. Similar to the text run parameters, each text line element may have parameters to specify the starting position for rendering. And text lines within each page may be grouped together to generate text page elements. The element division and descriptions provided herein is by way of example. Other groupings or other divisions of elements for document may be made as necessary or in accordance with design preferences.

In FIG. 2A, for example, the following text line XML, may be generated for the last line of the first paragraph in the wire frame 221.

```
<textLine x="X" y="Y" w="200" h="20">
    <textRun x="X" y="Y" w="70" h="20" fontId="1" fontSize="12"
    fontColor="Black">
        Curabitur id iaculis quam.
    </textRun>
</textLine>
```

Figure 2B:
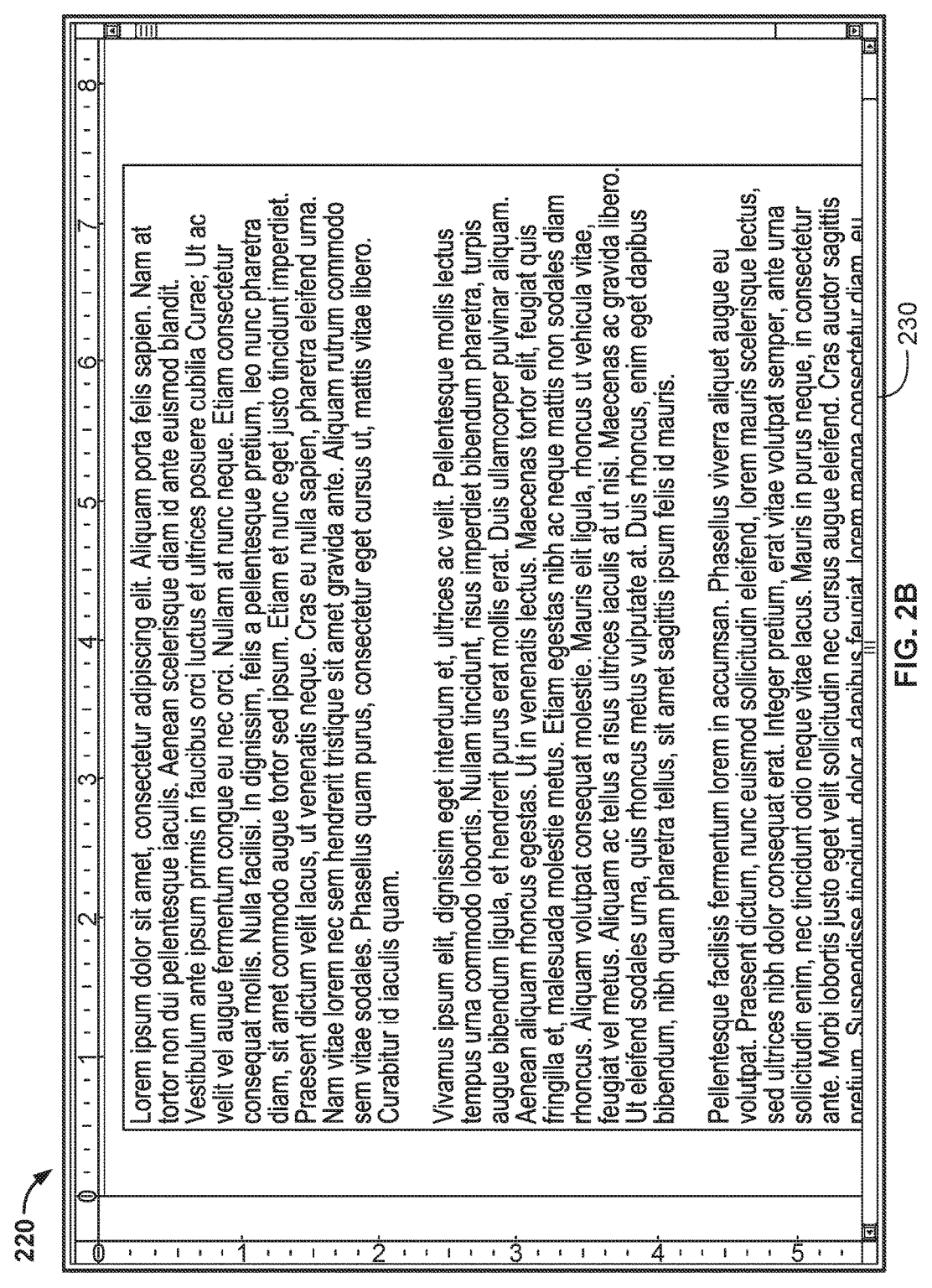
Figure 2C:
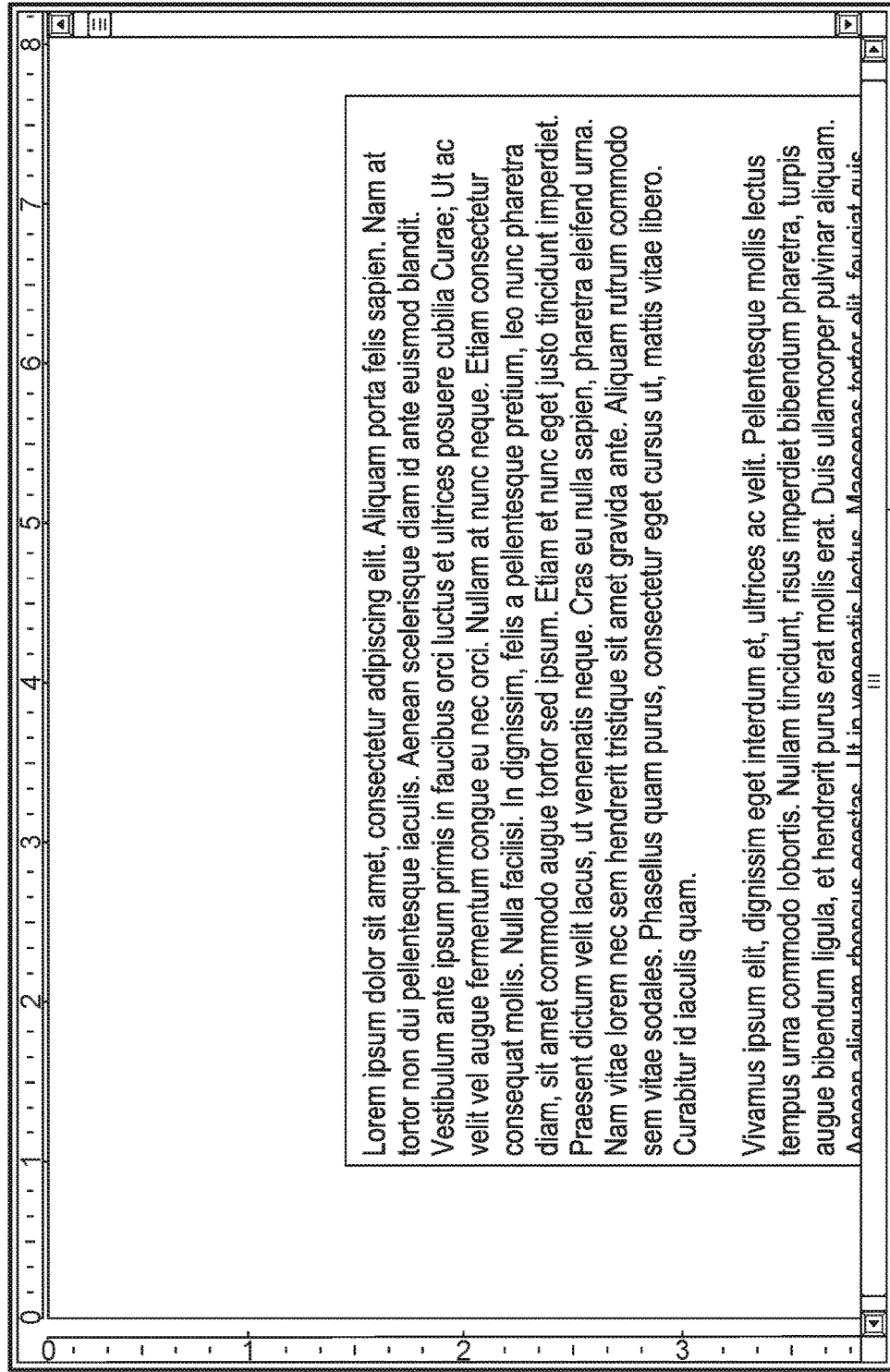
FIG. 2C is a diagram of an example GUI illustrating a WYSIWYG view of FIG. 2A document in a web browser on a computing device running Mac® OS.

Since the character positions calculation is based on the server side fonts system 180, the position (X, Y) for the last line of the first paragraph in the wire frame 221 is the same regardless the differences of the browser, the operating system, and the device on the client side. FIGS. 2B-2D illustrate the rendering of the same document on browsers running on different platforms and devices, such as a desktop computing device with WINDOWS® operating system in FIG. 2B, MAC® OS in FIG. 2C, and a mobile device in FIG. 2D.

As shown in FIGS. 2B-2D, different computing device may have different display dimension and resolutions. In addition, different operating system may have different algorithm to render font. In order to provide WYSIWYG and cross platform fidelity, the same document would have the same layout including the same line breaks and page breaks position cross platforms and devices.

For example, in FIG. 2A, the first paragraph shown in the wire frame 221 has 10 lines. The same paragraph shown in FIG. 2B, when viewed in a browser 230 on a desktop computing device running WINDOWS® operating system, has the same 10 lines in the wire frame 230, and the last line of the paragraph would have the same starting position of (X, Y). Similarly, the same document, when viewed in a browser 250 on a desktop computing device running Mac® OS and in a browser 270 on a mobile computing device, would render the same 10 lines for the first paragraph in the frame 240 of FIG. 2C and the wire frame 260 of FIG. 2D. Thus, as shown in FIGS. 2A-2D, the web based word processing application may provide WYSIWYG and cross platform fidelity.

Figure 3:
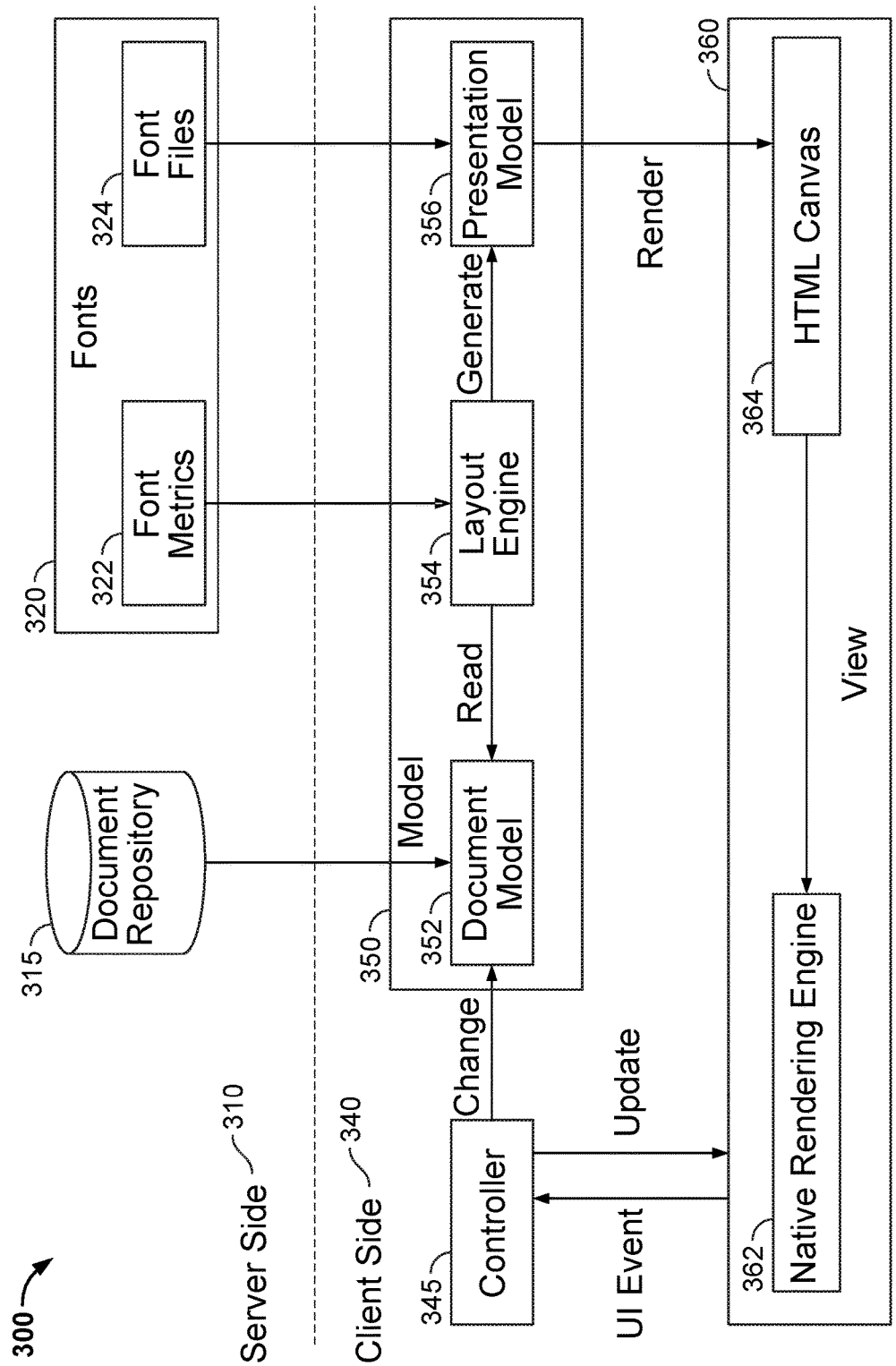
FIG. 3 is a diagram of an example system illustrating using server side font preparation under model-view-controller framework to achieve WYSIWYG and cross platform fidelity.

FIG. 3 is a diagram of an example system 300 illustrating using server side font preparation under model-view-controller framework to achieve WYSIWYG and cross platform fidelity. The system 300 may include at least one server on a server side 310. The server side 310 may provide web based word processing services to computing devices on a client side 340. Users may bring up a web based word processing application through browsers on the client side 340 computing devices. The client side 340 devices may be communicatively coupled to the server side 310 in a network using a variety of configures or topologies as are known in the art.

The web based word processing application on the client side 340 may be executed by a web browser in a model-view-controller framework. The model-view-controller implementation as shown in FIG. 3 may include a controller 345, a model 350 and a view 360. The controller 345, operatively coupled to the model 350 and the view 360, may intercept UI events, such as clicks on icons and keystrokes on a keyboard, may cause such actions to be implemented through the model 350 and reflected on the update of the view 360. The model 350 may include a document model 352, a layout engine 354, and a presentation model 356.

When a user brings up the web based word processing application in a web browser, the application may run in the web browser, use programming code, such as Hyper-Text Markup Language (HTML) and JavaScript, to download a model from a document repository 315 residing on the server side 310. The download instruction may come from the controller 345. The downloaded model may be stored in the memory operated coupled with the document model 352. After the model is downloaded from the server side 310, the layout engine 354 may read the model from the document model 352. The document model elements including paragraphs, spans, characters and styles may then be processed by the layout engine 354. Parsing the elements, the layout engine 354 may generate a displayable format of the document including the character positions. The displayable format may include elements such as page, line, text run, and glyph, etc.

In order to calculate character positions, the layout engine 354 may obtain font metrics 332 from a fonts system 320 on the server side 310. The fonts system 320 including a repository of font files 324 may provide management for the font files 324. In preparation for font rendering on the client side 340, the fonts system 320 on the server side 310 may preload and parse the font files 324 to generate platform and device independent font metrics 322. In some example embodiments. The font files 324 and the font metrics 322 may be sent to the client side 340 on demand during the layout calculation and the rendering.

For example, the fonts system 320 may preload and parse the font files 324 to derive platform and device independent font metrics 332 for a font as follows.
  unitPerEm=2048;
  glyphWidths=[0, 1024, 2345, . . . ];

As is known in the art, an em is a unit of width in the field of typography. As shown above, the unitPerEm is specified for characters in a font. And the width for glyphs in the font may be stored in a data structure with index of each glyph for a font, such as glyphWidths shown above. In addition to glyph width, the font metrics 322 may include other glyph geometry properties, such as the height of the glyphs for each font, among others. Having generated the font metrics 322, when the layout engine 354 requests the font metrics 332 for character positions calculation, the font metrics 332 for a font may be retrieved by the layout engine 354 using the following method.

```
getGlyphWidth(int glyphId, double fontSize) {
    return glyphWidths[glyphId] * fontSize / unitPerEm;
}
```

Once the layout engine 354 obtains the width of glyphs corresponding to characters in the document, the layout engine 354 may use the glyphs geometry information, such as width and height, to place the glyphs in the context of a drawing surface and determine how the document is divided into page criteria. The layout engine 354 may loop through elements in the document model 352 and build up lines by concatenating the glyphs into a text run and incrementing a width counter by the width of the glyphs until a full line width is taken up. Similarly, to build pages, the layout engine 354 may loop through elements in the document model 352 and build up pages by concatenating the glyphs in each line and incrementing a height counter by the height of the glyphs within each line until a full page height is taken up. Adjustments may be made to find a natural break point for a line, such as locate a break on a white space instead of breaking up a word or phrase to two lines. Similar adjustments may be performed to find a nature break point for a page.

The output of the layout calculation may be represented using a markup language, such as XML. Other techniques may be employed to represent layout and text to be rendered and embodiments are not limited to any particular techniques. In some example embodiments, the output may include elements such as pages, lines, and text runs. Each page rendered may correspond to a page element, each line may correspond to a line element, and segments of text with the same rendering parameters in a line may be grouped together to as text run elements. The result may be stored in memory operatively coupled to the presentation model 356. For example, the following is an example of a line element comprising two text run elements.

```
<textLine x="10" y="0" w="200" h="20">
  <textRun x="10" y="0" w="40" h="20"
    fontId="1" fontSize="12" fontColor="Black">Hello, </textRun>
  <textRun x="50" y="0" w="50" h="20"
    fontId="1" fontSize="10" fontColor="Blue">world!</textRun>
</textLine>
```

As shown above, in each element, the position of the element for rendering is calculated by the layout engine 354. In an example text line with the width of 200 and height of 20 starting at position with (x, y) coordinate value of (10, 0), width value of 200, and height value of 20, the text line element includes two text run elements. Text with the same rendering parameters in a line, such as "Hello," with the same font (fontId of 1), the same font size (fontSize of 12), and the same font color (fontColor of Black) may be grouped together in a first text run element for rendering at position (10, 0), with width value of 40 and height value of 20. Following the text "Hello,", characters with the same rendering parameters in the line, such as "world!" with the fontId of 1, fontSize of 10, and fontColor of Blue may be grouped together in a second text run element for rendering at position (50, 0), with width value of 40 and height value of 20.

The output generated by the layout engine 354 as shown above may be stored in the memory operatively coupled with the presentation model 356. The model may then be used by the view 360 to provide browser executable text rendering instructions. The text rendering instructions may include the text character positions and the dimension of the glyphs, among others. The browser executable text rendering instruction may include drawing commands for drawing characters on the browser supported drawing surface, such as HTML5 canvas 364.

In some example embodiments, the presentation model 356 uses HTML5 canvas fillText command to instruct a native rendering engine 362 to draw glyphs. An example of the drawing of a glyph corresponding to the character "H" at position (10, 0) is shown as follows.

```
<canvas id="e" width="200" height="200"></canvas>
<script>
    var canvas = document.getElementById("e");
    var context = canvas.getContext("2d");
    context.font = "12px Arial";
    context.fillText("H", 10, 0);
</script>
```

The browser executable text rendering instructions, including the fillText command as shown above, may then be used by the native rendering engine 362 for rendering. The native rendering engine 362 may be a rendering engine used a browser on the client side 340. The native rendering engine 362 may receive text rendering instructions and draw characters according to the instructions. In the above example, the fillText command instructs the native rendering engine 362 to draw characters of font "12px Arial". Depending on the platform, different native rendering engine 362 may render different character dimension for font "12px Arial".

For example, different browsers may use different rendering engines. INTERNET EXPLORER® uses Trident, FIREFOX® uses Gecko or Pango, SAFARI™ uses WebKit. CHROME™ and OPERA™ (from version 15) use Blink. Different rendering engines may render different character dimension for the same font. In order to provide consistent layout, the presentation model 356 may instruct the view 360 to use the font files 324 from the server side 310. The instruction ensures that despite the platform and device differences, the native rendering engine 362 on the client side 340 uses the same font files for rendering.

In some example embodiments, the font files 324 may be obtained from the server side 310 using CSS3 @font-face tag. An example of the code for retrieving the font files 324 from a server side 310 location through the use of a URL is shown below.

```
<style type="text/css">
    @font-face {
        font-family: "Times New Roman Bold";
        src: url("http://developer.emc.com/dev/files/TNRBd.ttf");
    }
</style>
```

The above instruction may be provided by the presentation model 356 and executed by the native rendering engine 362 in the view 360. As shown above, a font may be identified by a name, such as Times New Roman Bold. Under the rule of Cascading Style Sheet (CSS), a style sheet may use @font-face tag with "font-family" property listing the font name for text rendering and "src" property specifying the location of the font file corresponding to the font. In the above example and according to an example embodiment, the view 360 would identify "Times New Roman Bold" as the font to use for rendering of a segment of text, such as text run, text line, text page tec. And the view 360 would identify a location pointing to a font file corresponding to the font on a remote server. Using server side 310 font metrics 322 and font files 324, the web based word processing application, according to some example embodiments, renders document with a consistent layout including the same line breaks and page breaks in different browsers running on different operating systems and different devices. Thus, the web based word processing application provides WYSIWYG and cross platform fidelity.

Figure 4A:
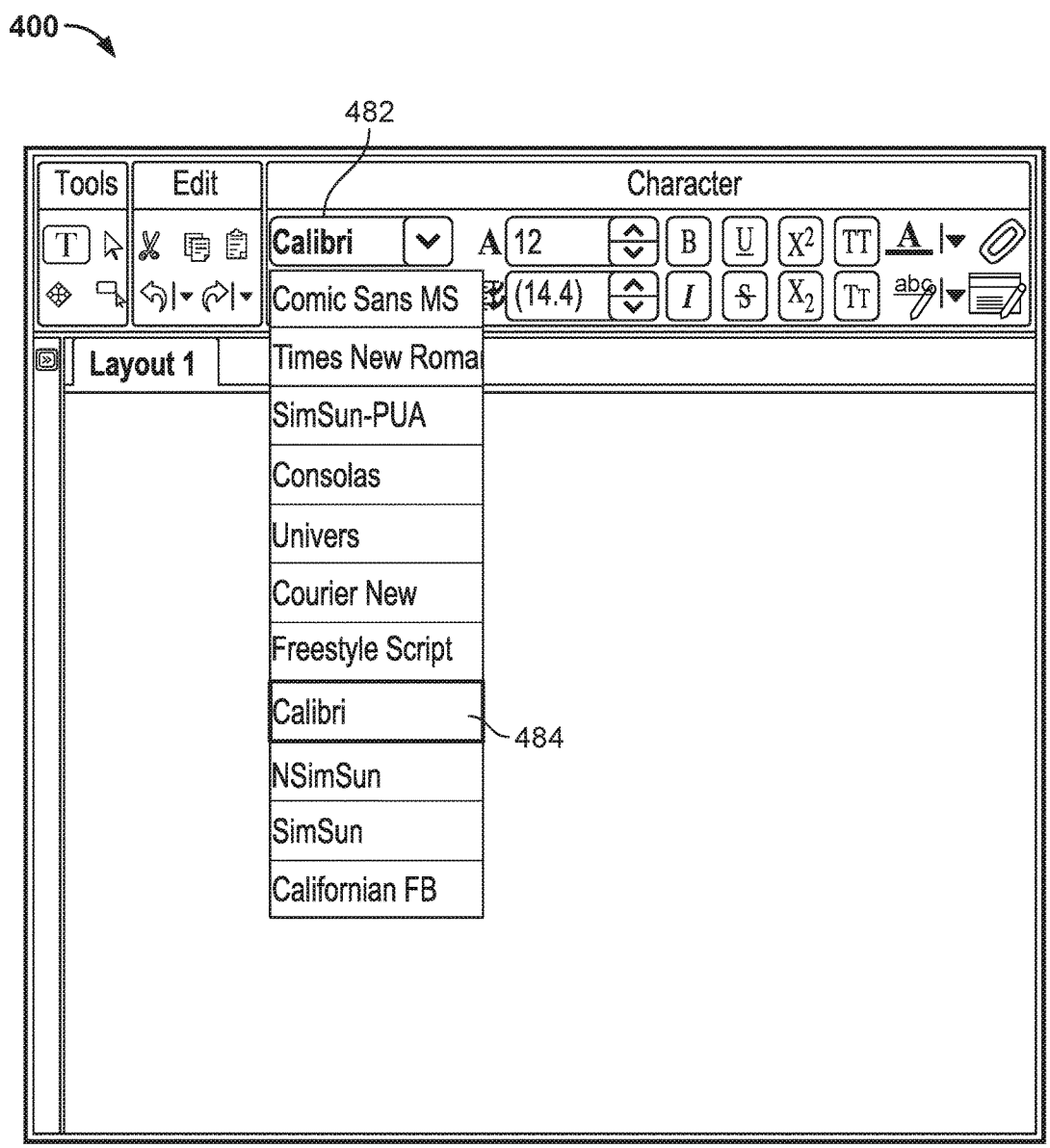
FIG. 4A is a diagram of an example GUI illustrating a font list with the default font selected in a web based word processor.

In some example embodiments, since loading font metrics and font files from the server may take time, systems and methods according to embodiments may load the font metrics and the font file for a default font from the server upon bringing up the web based word processing application. FIG. 4A is a diagram of an example GUI 400 illustrating a font list with the default font selected in a web based word processor. In some example embodiments, the example GUI 400 may be displayed in the view 360. Upon loading a document from the document repository, at least one font would be available to the user. For example, as shown in FIG. 4A, a list of fonts available for a user may be provided in the drop down menu 482. The list of fonts may be obtained by the controller 345 and displayed in the view 360. A default font 484 may be selected in the drop down menu 482. With the default font 484 selected, the font metrics and the font files corresponding to the default font 484 may be downloaded by the controller 345 from the server side to the client side for layout calculation. Having downloaded the font metrics and the font files for the default font 484, subsequent editing using the default font 484 may use the locally available metrics and the font files for fast layout calculation and rendering. The system for font list and default font preparation in accordance with some example embodiments is further illustrated in FIG. 5.

Figure 4B:
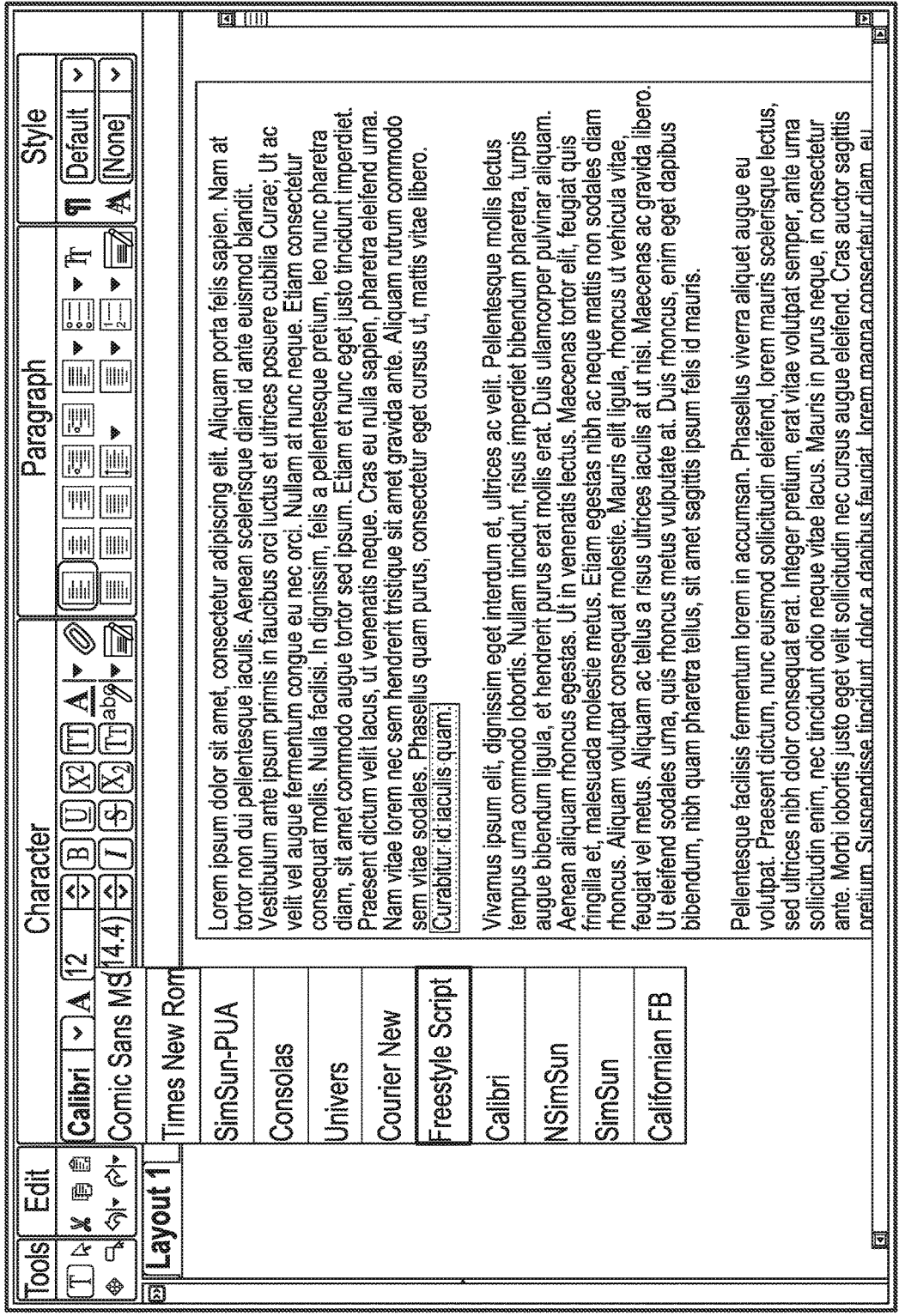
FIG. 4B is a diagram of an example GUI illustrating choosing a different font in a web based word processor.

During word processing using the web based word processing application, a different font. For performance optimization, the first time a font is used, the font information may be downloaded from a server, and subsequent use of the font may use the downloaded font information for layout and rendering. FIG. 4B is a diagram of an example GUI 450 illustrating choosing a different font in a web based word processor. In some example embodiments, the example GUI 450 may be displayed in the view 360. As shown in FIG. 4B, a different font from the default font, such as "Freestyle Script" is selected by the user from the controls. A segment of text may be highlighted to indicate the user's intent of changing the segment of text to font "Freestyle Script". The controller 345 may detect the UI change, and update the document model 352. Upon updating the document model, the layout engine 354 may recalculate the layout using font metrics corresponding to the font "Freestyle Script". The calculation may require a download of the font metrics corresponding to "Freestyle Script" for the first time the font is used. Subsequent editing using the font "Freestyle Script" may use the downloaded font metrics for layout calculation. Once the layout engine finishes the layout calculation, the presentation model 356 may instruct the view 360 to render the updated document. Among the instructions given, the presentation model 356 may determine that the font file corresponding to the font "Freestyle Script" has not been downloaded from the server before. The presentation model may use place CSS3 @font-face tag as shown above to instruction the native rendering engine 362 to render the text using the font file from the server. Subsequent text rendering using the font "Freestyle Script" may use the downloaded font files for fast text rendering.

Figure 5:
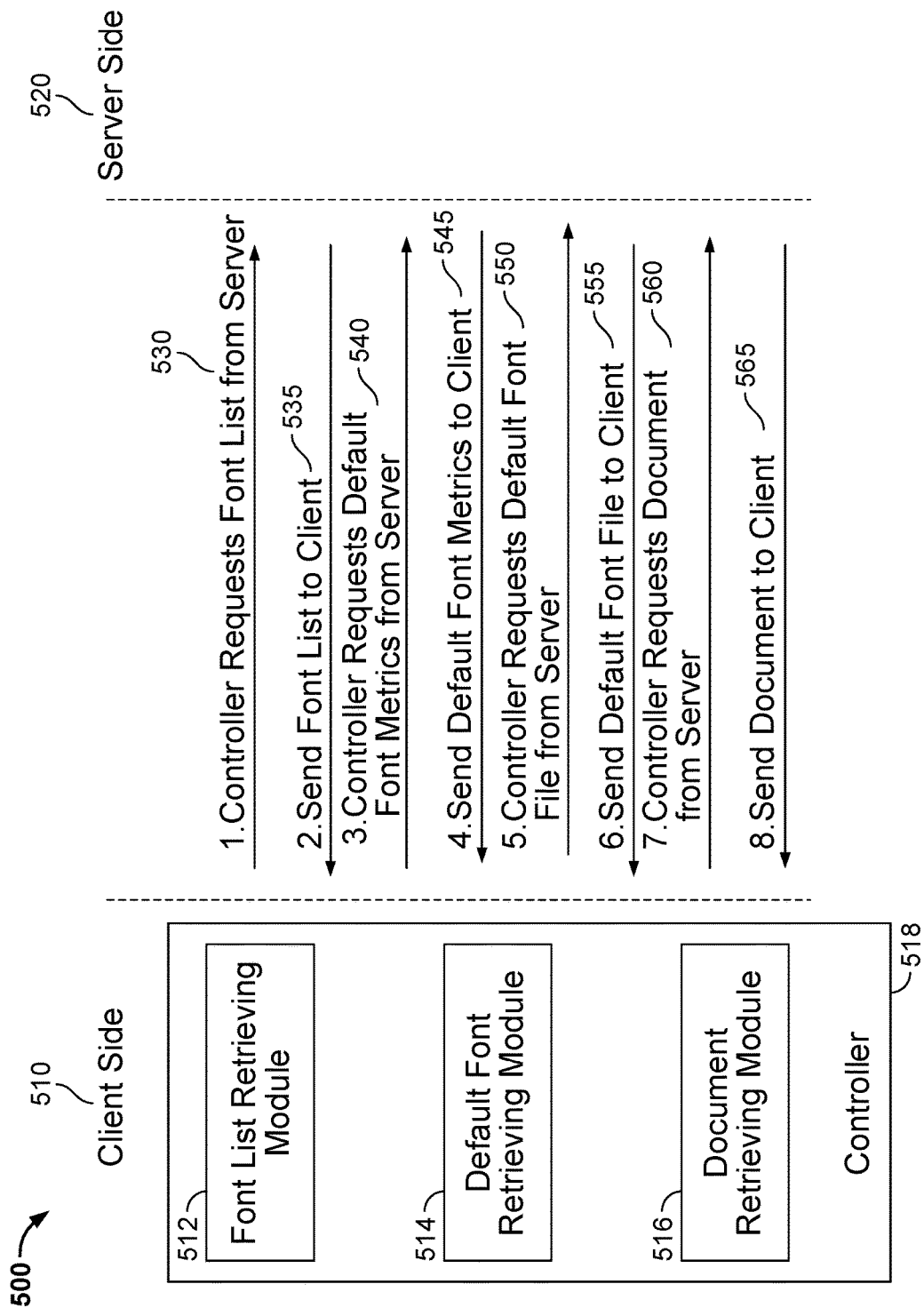
FIG. 5 is a diagram of an example system illustrating font list and default font preparation.

FIG. 5 is a diagram of a system 500, according to an example embodiment, illustrating font list and default font preparation. In the system 500, a controller module 518 residing on a computing device on the client side 510 includes a font list retrieving module 512, a default font retrieving module 514, and a document retrieving module 516. When bringing up the web based word processing application on the client side 510, a list of fonts available for a user may be provided. The list of fonts may be obtained by the font list retrieving module 512 by first sending a request of a font list to the server in step 1, 530. The font list may be returned from the server side 520 in step 2, 535. The font list may be displayed to the user on the client side 510 with a default font selected. The default font retrieving module 514 may download the font metrics and the font file corresponding to the default font from the server side. The download may first request default font metrics from the server in step 3, 540. Once the server side 520 sends the default font metrics to the client side 510 in step 4, 545, the default font retrieving module 514 may further request the default font file from the server in step 5, 550. After the default font file is sent from the server side 520 in step 6, 555, the default font may be locally available to the client side 510 during subsequent use. Having downloaded the font metrics and the font files for the default font, the document retrieving model 516 may request a document from the server side 520 in step 7, 560. The document may be sent in step 565 to the client side 510 and rendered using the locally available default font metrics and default font file.

Figure 6:
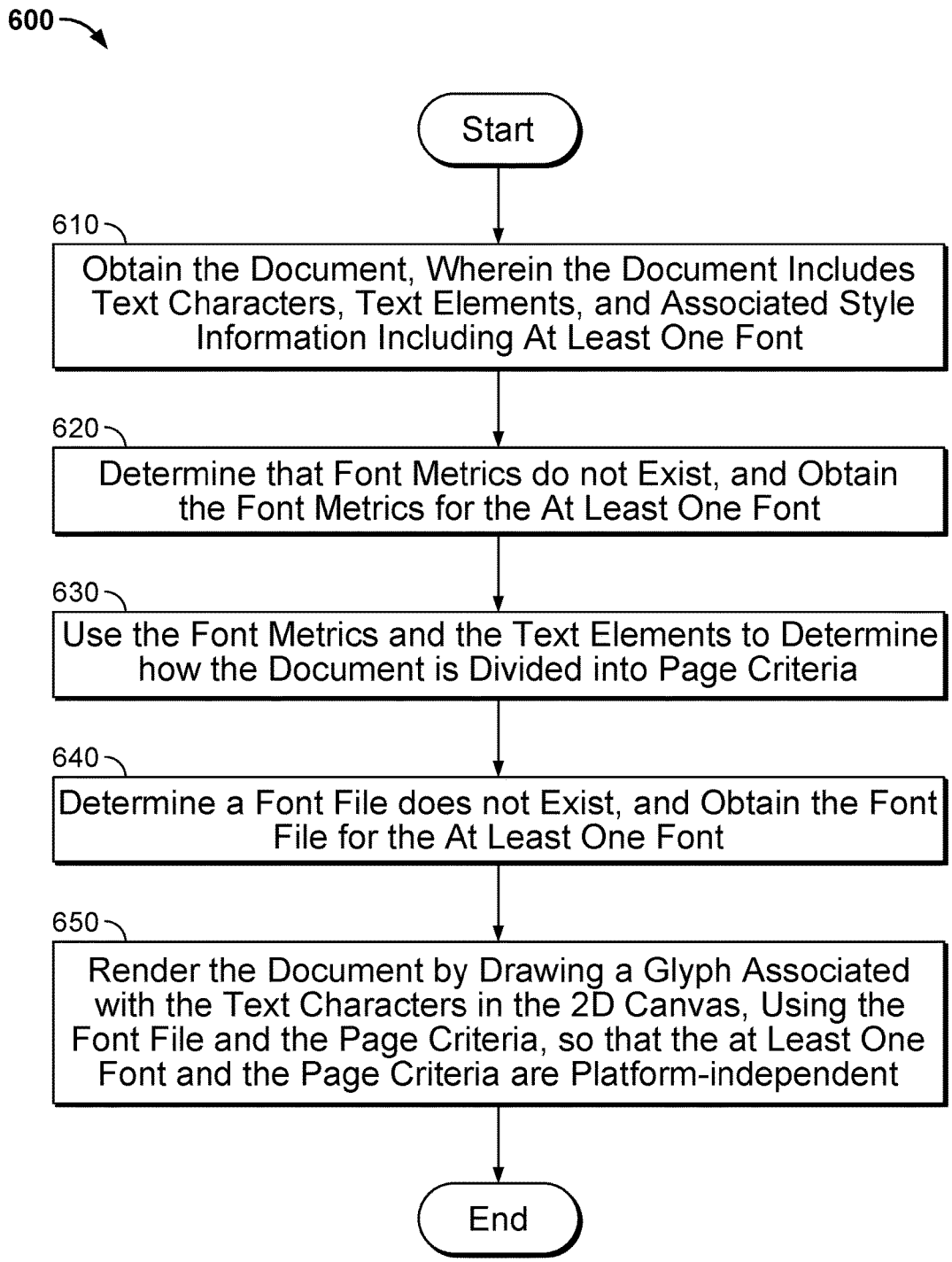
FIG. 6 is a diagram of an example computer implemented method executed to perform using server side font preparation to achieve WYSIWYG and cross platform fidelity.

FIG. 6 is a diagram of a computer implemented method 600, according to an example embodiment, executed by browser applications 168, 178, 188, and 198 on computing devices 160, 170, 180, and 190, The computer implemented method 600 uses server side font preparation to achieve WYSIWYG and cross platform fidelity. An operation 610 is executed by controller modules 166, 176, 186, and 196 as part of the web based word processing browser applications 168. The operation 610 is performed to obtain a document from the computing devices 160, 170, 180, and 190 for editing and/or displaying in the browser applications 168, 178, 188, and 198. In some example embodiments, the document is retrieved from the document repository 130 residing on the server 120 in the cloud 110. The document may include text characters, text elements, and associated style information including at least one font. In some example embodiments, the text elements include at least one of paragraphs, spans, and the text characters. A document may include at least one paragraph element. Each paragraph element may include at least one span element. And a span element may include a segment of text characters that has the same attributes and style. Having retrieved the document, models 162, 172, 182, and 192 may store the document in memory operatively coupled with the models 162, 172, 182, and 192. The layout engine 354 as part of the models 162, 172, 182, and 192 may then parse the text elements and the associated style information.

Based on a font name and/or a font identifier associated with the at least one font, an operation 620 is executed to first determine whether font metrics for the at least one font exist on the computing devices 160, 170, 180, and 190, and based on the determination that the font metrics for the at least one font do not exist on the computing devices 160, 170, 180, and 190, obtain the font metrics for the at least one font. In some example embodiments, the font metrics are specified using XML. The font metrics may be derived from a font file associated with the at least one font and include glyph geometry comprising height and weight. The situation that the font metrics for the at least one font do not exist on the computing devices 160, 170, 180, and 190 may arise when the at least one font is used the first time for editing on the computing devices 160, 170, 180, and 190. In some example embodiments, the font metrics are retrieved from the fonts system 180 residing on the server 120.

Having downloaded the font metrics, an operation 630 is executed by the layout engine 354 to use the font metrics and the text elements to determine how the document is divided into page criteria. In some example embodiments, the page criteria include at least one of glyphs, text runs, lines, and pages. The calculation by the layout engine 354 may include based on the font metrics and the style information, convert the text characters into the glyphs, based on the spans and the glyphs, generating the text runs, and based on the text runs, calculate a position of each of the glyphs within the lines and the pages on the 2D canvas.

Following the layout calculation, an operation 640 is executed by the presentation model as part of the models 162, 172, 182, and 192 to first determine if a font file associated with the at least one font exists on the computing devices 160, 170, 180, and 190, and upon the determination that the font file does not exist, the font file for the at least one font may be obtained from the fonts system 180 on the server 120 based on the font name and/or font identifier. The font file may have information associated with glyphs defined for the at least one font.

Using the page criteria calculated by the layout engine 354 and the font file retrieved from the server 120, an operation 650 is executed by the views 164, 174, 184, and 194 to render the document by drawing glyphs associated with the text characters in a two-dimensional (2D) canvas, so that the at least one font and the page criteria are platform-independent. The rendering is carried out by a native rendering engine on each of the views 164, 174, 184, and 194. And the 2D canvas used as a drawing surface may be a HTML5 canvas.

Figure 7:
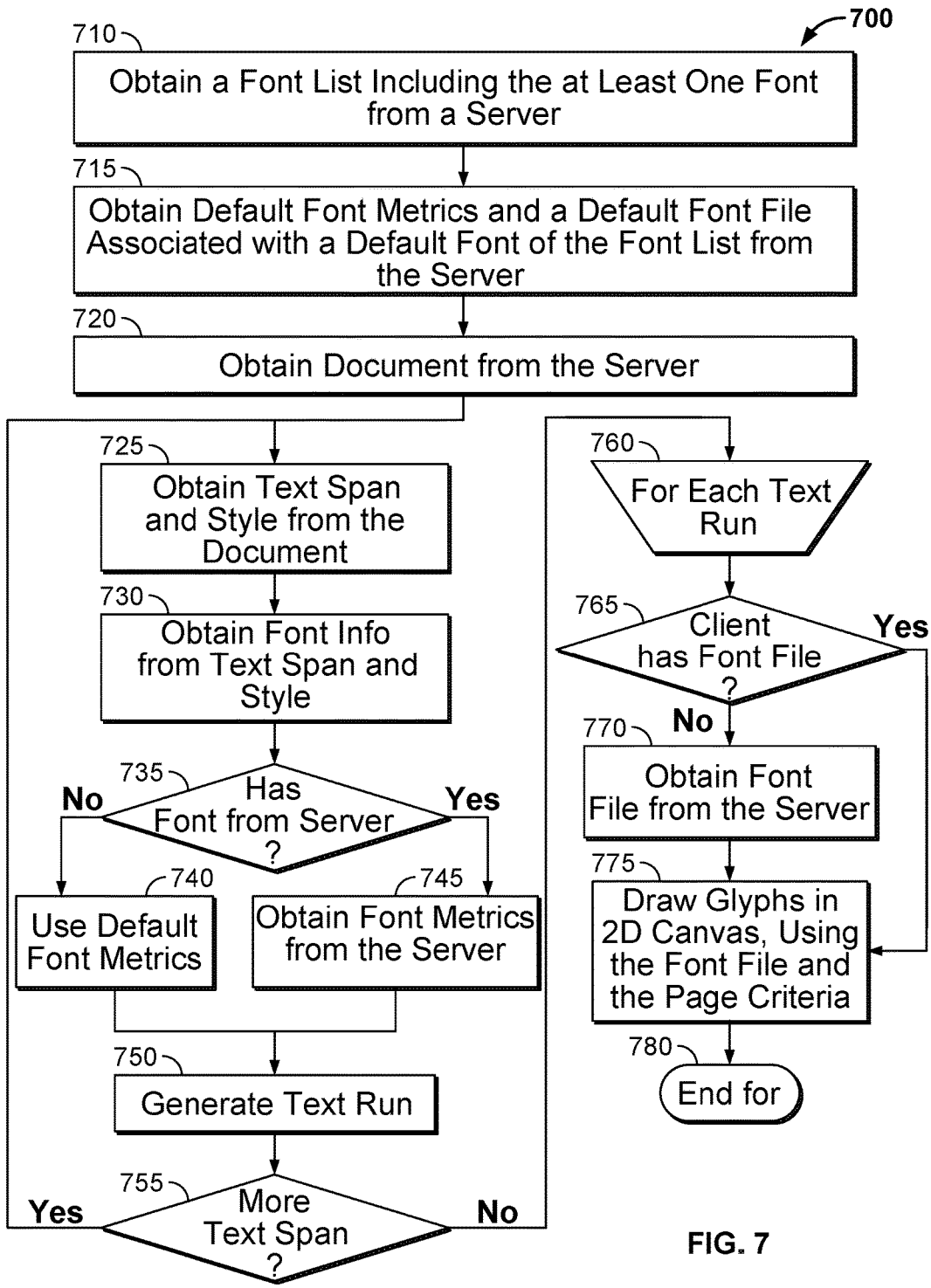
FIG. 7 is a flowchart illustrating the execution of an example operation to perform word processing in a web based browser using server side font preparation to achieve WYSIWYG and cross platform fidelity.

FIG. 7 is a flowchart illustrating an example method 700, executed by browser applications 168, 178, 188, and 198 on computing devices 160, 170, 180, and 190, to perform word processing in a web based browser using server side font preparation to achieve WYSIWYG and cross platform fidelity. An operation 710 is executed by controller modules 162, 172, 182, and 192 residing on the computing devices 160, 170, 180, and 190 to obtain a font list including the at least one font from the server 120. The font list 482 as shown in FIG. 4A may have a default font 484 selected. An operation 715 is executed by the controller modules 162, 172, 182, and 192 to obtain default font metrics and a default font file associated with the default font from the server 120 fonts system 180. The retrieval of the default font metrics and the default font file may be based on the font name and/or a font identifier. Once the default font information is retrieved from the server 120, an operation 720 is executed by the controllers 162, 172, 182, and 192 to obtain a document from the document repository 130 residing on the server 120. The document may be stored in the document model 352.

Having at least one font from the server 120, operations 725-755 are executed by the layout engine 354 to calculate layout, such as determining how the document is divided into page criteria. The layout engine 354 may loop through elements in the document model 352 and build up lines by concatenating the glyphs into a text run and incrementing a width counter by the width of the glyphs until a full line width is taken up. For example, an operation 725 is executed to obtain a text span element and the associated style from the document, followed by an operation 730 to extract the font information from the text span and the style. The style information may include font information such a font name and/or a font identifier.

Using the font information, a decisional operation 735 is executed to determine if the computing devices 168, 178, 188, and 198 have the font. The determination may be made by examining both the computing devices 168, 178, 188, and 198 and the server 120, such as examining whether the computing devices 168, 178, 188, and 198 have downloaded the font from the server 120 fonts system 180 before, and whether the server 120 fonts system 180 has the font. In case the font is not available from the server 120 now or before, an operation 740 is executed to use the default font obtained after the operation 715 execution. In case the font is available, an operation 745 is executed to obtain the font metrics retrieved from the server 120. The font metrics may have been retrieved before when the at least one font was used previously. Alternatively, the font metrics may be requested by the layout engine 354 and retrieved and sent by the server 120.

Based on the font metrics and the text elements within the document, an operation 750 is executed by the layout engine 354 to generate text run. Following the text run generation, a decisional operation 755 is executed by the layout engine 354 to determine if other spans within the document need to be processed. Though not shown in FIG. 7, the text run generation is part of the layout calculation by the layout engine 354. The layout engine 354 may loop through elements in the document model 352 and build up lines by concatenating the glyphs into a text run and incrementing a width counter by the width of the glyphs until a full line width is taken up. Similarly, to build pages, the layout engine 354 may loop through elements in the document model 352 and build up pages by concatenating the glyphs in each line and incrementing a height counter by the height of the glyphs within each line until a full page height is taken up.

Upon completion of the layout calculation, operations 760-780 are executed by the presentation model 356 and the view 360 on each of the computing devices 168, 178, 188, and 198. The presentation model 356 loops through the text run elements and instruct the view 360 to render text. Between the beginning looping operation 760 and the end looping operation 780, a decisional operation 765 is first executed by the presentation model 356 to determine if the computing devices 168, 178, 188, and 198 have the font file associated with the at least one font. In case the computing devices 168, 178, 188, and 198 do not have the font file, an operation 770 is executed to obtain the font file from the server 120 fonts system 180 before executing an operation 775 to send instructions to the view 360 for text rendering. The instruction may include rendering the document by drawing glyphs associated with the text characters in the 2D canvas, using the font file and the page criteria, so that the at least one font and the page criteria are platform-independent.

Using the fonts system on the server side for a web based word processing application provides the benefit of not only WYSIWYG and cross platform fidelity, it also has the advantage of fonts management at a centralized location. The system according to some example embodiments may control font availabilities to users. Customization may be built in to provide different set of fonts to different users. Instead of purchasing and maintaining many fonts that may or may not be used, the users may realize the savings by purchasing less number of fonts, putting the purchased fonts to productive use, and leaving the fonts management task to the server in the cloud.

For the sake of clarity, the processes and methods herein have been illustrated with a specific flow, but it should be understood that other sequences may be possible and that some may be performed in parallel, without departing from the spirit of the system and method. Additionally, steps may be subdivided or combined.

All references cited herein are intended to be incorporated by reference. Although the present system and method has been described above in terms of specific embodiments, it is anticipated that alterations and modifications to this system and method will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the system and method is not to be limited to the details given herein. It is therefore intended that the disclosure and following claims be interpreted as covering all such alterations and modifications as fall within the true spirit and scope of the system and method.

What is claimed is:

1. A computer implemented method for platform-independent rendering of a document in a web browser supporting a two-dimensional (2D) canvas, comprising:
obtaining from a server that includes a document repository and a fonts system the document, wherein the document includes text characters, text elements, and associated style information including at least one font;
determining that font metrics associated with a segment of text characters included in the document do not exist;

obtaining from the fonts system the font metrics for the at least one font;

using the font metrics and the text elements to determine how the document is divided into page criteria;

determining that a font file associated with the segment of text characters exists at the font system;

determining that a web browser font file does not match the font file associated with the segment of text characters;

obtaining from the fonts system the font file associated with the segment of text characters; and rendering the document by drawing glyphs associated with the text characters in the 2D canvas, using the obtained font file and the page criteria, so that the at least one font and the page criteria are platform-independent.

2. The method of claim 1, wherein the text elements include at least one of paragraphs, spans, and the text characters.

3. The method of claim 2, wherein the page criteria include at least one of glyphs, text runs, lines, and pages.

4. The method of claim 3, wherein using the font metrics and the text elements to determine how the document is divided into the page criteria includes:

based on the font metrics and the associated style information, converting the text characters into the glyphs;

based on the spans and the glyphs, generating the text runs; and based on the text runs, calculating a position of each of the glyphs within the lines and the pages on the 2D canvas.

5. The method of claim 1, wherein the font file has information associated with glyphs defined for the at least one font.

6. The method of claim 1, wherein for each of the glyphs, the font metrics are derived from the font file and include glyph geometry comprising height and weight.

7. The method of claim 1, wherein obtaining the document includes:

obtaining a font list including the at least one font from the server; and obtaining default font metrics and a default font file associated with a default font of the font list from the server.

8. The method of claim 1, wherein the font metrics are specified using extensible Markup Language (XML).

9. The method of claim 1, wherein obtaining the font file associated with the segment of text characters includes retrieving the font file associated with the segment of text characters for at least one font from the server through a use of a URL.

10. A system, comprising:

a processor configured to:

obtain from a server that includes a document repository and a fonts system a document, wherein the document includes text characters, text elements, and associated style information including at least one font;

determine that font metrics associated with a segment of text characters included in the document do not exist;

obtain from the fonts system the font metrics for the at least one font;

use the font metrics and the text elements to determine how the document is divided into page criteria;

determine that a font file associated with the segment of text characters exists at the font system;

determine that a web browser font file does not match the font file associated with the segment of text characters;

obtain from the fonts system the font file associated with the segment of text characters; and render the document by drawing glyphs associated with the text characters in the 2D canvas, using the obtained font file and the page criteria, so that the at least one font and the page criteria are platform-independent; and a memory coupled to the processor and configured to provide the processor with instructions.

11. The system of claim 10, wherein the text elements include at least one of paragraphs, spans, and the text characters.

12. The system of claim 11, wherein the page criteria include at least one of text runs, lines, and pages.

13. The system of claim 12, wherein to use the font metrics and the text elements to determine how the document is divided into the page criteria, the processor is configured to:

based on the font metrics and the associated style information, convert the text characters into the glyphs;

based on the spans and the glyphs, generate the text runs; and based on the text runs, calculate a position of each of the glyphs within the lines and the pages on the 2D canvas.

14. The system of claim 10, wherein the processor is further configured to:

obtain a font list including the at least one font from the server;

obtain default font metrics and a default font file associated with a default font of the font list from the server; and obtain the document from the server using a document retrieving module.

15. The system of claim 10, wherein to obtain the font file associated with the segment of text characters the processor is configured to retrieve the font file associated with the segment of text characters from the server through a use of a URL.

16. A computer program product embodied on a non-transitory computer storage medium and comprising instructions for:

obtaining from a server that includes a document repository and a fonts system a document, wherein the document includes text characters, text elements, and associated style information including at least one font;

determining that font metrics associated with a segment of text characters included in the document do not exist;

obtaining from the fonts system the font metrics for the at least one font;

using the font metrics and the text elements to determine how the document is divided into page criteria;

determining that a font file associated with the segment of text characters exists at the font system;

determining that a web browser font file does not match the font file associated with the segment of text characters;

obtaining from the fonts system the font file associated with the segment of text characters; and rendering the document by drawing glyphs associated with the text characters in the 2D canvas, using the obtained font file and the page criteria, so that the at least one font and the page criteria are platform-independent.

17. The computer program product of claim 16, wherein the text elements include at least one of paragraphs, spans, and the text characters.

18. The computer program product of claim 17, wherein the page criteria include at least one of text runs, lines, and pages.

19. The computer program product of claim 18, wherein using the font metrics and the text elements to determine how the document is divided into the page criteria includes:
   based on the font metrics and the associated style information, converting the text characters into the glyphs;
   based on the spans and the glyphs, generating the text runs; and
   based on the text runs, calculating a position of each of the glyphs within the lines and the pages on the 2D canvas.

20. The computer program product of claim 16, wherein obtaining the document includes:
   obtaining a font list including the at least one font from the server; and
   obtaining default font metrics and a default font file associated with a default font of the font list from the server.

* * * * *

UNITED STATES PATENT AND TRADEMARK OFFICE
CERTIFICATE OF CORRECTION

PATENT NO. : 10,460,013 B2
APPLICATION NO. : 16/002474
DATED : October 29, 2019
INVENTOR(S) : Wang Xin Page 1 of 1

It is certified that error appears in the above-identified patent and that said Letters Patent is hereby corrected as shown below:

In the Claims

In Column 17, Line 46, delete "extensible" and insert --eXtensible--, therefor.

Signed and Sealed this
Seventh Day of April, 2020

Andrei Iancu
*Director of the United States Patent and Trademark Office*